US009294440B1

(12) United States Patent
Conner et al.

(10) Patent No.: US 9,294,440 B1
(45) Date of Patent: Mar. 22, 2016

(54) SECURE INTER-ZONE DATA COMMUNICATION

(75) Inventors: James A. Conner, Federal Way, WA (US); Jeremiah J. Connolly, Seattle, WA (US); Dennis Marinus, Dublin (IE); Tushaar Sethi, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 293 days.

(21) Appl. No.: 13/607,183

(22) Filed: Sep. 7, 2012

(51) Int. Cl.
*H04L 29/06* (2006.01)
(52) U.S. Cl.
CPC ................... *H04L 63/0236* (2013.01)
(58) Field of Classification Search
CPC .................................................. H04L 63/1458
See application file for complete search history.

(56) References Cited

U.S. PATENT DOCUMENTS

| | | | | | |
|---|---|---|---|---|---|
| 6,058,478 | A * | 5/2000 | Davis | ..................... | H04L 9/3247 713/170 |
| 6,321,267 | B1 * | 11/2001 | Donaldson | .............. | H04L 51/12 370/351 |
| 7,613,930 | B2 * | 11/2009 | Dotan | ..................... | G06F 21/52 713/187 |
| 8,370,529 | B1 * | 2/2013 | Hansen | ............... | H04L 63/0209 709/223 |
| 2007/0260873 | A1 * | 11/2007 | Hatfalvi | .............. | H04L 63/0272 713/154 |
| 2009/0288161 | A1 * | 11/2009 | Wei | .......................... | G06F 21/57 726/22 |
| 2012/0030731 | A1 * | 2/2012 | Bhargava | ................. | G06F 21/54 726/3 |
| 2013/0318594 | A1 * | 11/2013 | Hoy | .................... | H04L 63/0272 726/15 |

* cited by examiner

*Primary Examiner* — Ellen Tran
*Assistant Examiner* — Wasika Nipa
(74) *Attorney, Agent, or Firm* — Lee & Hayes, PLLC

(57) ABSTRACT

A proxy receives a message from a computing system in a trusted secure zone directed to a computing system outside the trusted secure zone. The proxy determines if the message includes trusted data. If the message includes trusted data, the proxy stores the trusted data for later use and provides the message to the destination computing system. When the proxy receives a message from a computing system outside the trusted secure zone directed to a computing system in the trusted secure zone, the proxy determines if the received message contains trusted data. If the message contains trusted data, the proxy determines if the trusted data matches previously stored trusted data. If the trusted data does not match, the proxy overwrites the trusted data in the message with the previously stored trusted data. The proxy then provides the modified message to the destination computing system in the trusted secure zone.

28 Claims, 6 Drawing Sheets

SECURE INTER-ZONE DATA COMMUNICATION

BACKGROUND

In some installations, server computers are compartmentalized into groups, referred to herein as "zones." For example, a trusted secure zone might be created in a data center that includes server computers configured to perform tasks that require a very high level of security and trust. The server computers in a trusted secure zone might maintain credit card information and perform payment-processing services, for instance. A trusted secure zone is typically secured both physically, through the use of physical access control mechanisms, and electronically, through the use of devices designed to monitor and control incoming and outgoing network traffic.

In some installations, an untrusted zone might also be utilized that does not include all the physical and network access control mechanisms used in a trusted secure zone. For instance, an organization might maintain a trusted secure zone that is restricted to a very small number of authorized employees and an untrusted zone that includes server computers that are accessible to a much larger group of employees. Some server computers in the untrusted zone might provide various services to other computers in the untrusted zone.

It may be desirable for server computers operating within a trusted secure zone to utilize services provided by server computers operating within an untrusted zone. Due to the highly sensitive nature of the computing operations performed within a trusted secure zone, it can be difficult to enable this functionality in a manner that does not create significant duplication of services and that does not compromise the security of the trusted secure zone.

One mechanism utilized to provide the functionality described above involves duplicating certain functionality provided by server computers operating in the untrusted zone within the trusted secure zone. Data is then periodically synchronized from the server computers operating in the trusted secure zone to the server computers operating in the untrusted zone. This mechanism, however, may be undesirable because it creates duplicate services in both the trusted secure zone and the untrusted zone, makes operating the trusted secure zone more complex, and may involve the sometimes complex synchronization of data from the trusted secure zone to the untrusted zone.

It is with respect to these and other considerations that the disclosure made herein is presented.

DETAILED DESCRIPTION

Figure 1:
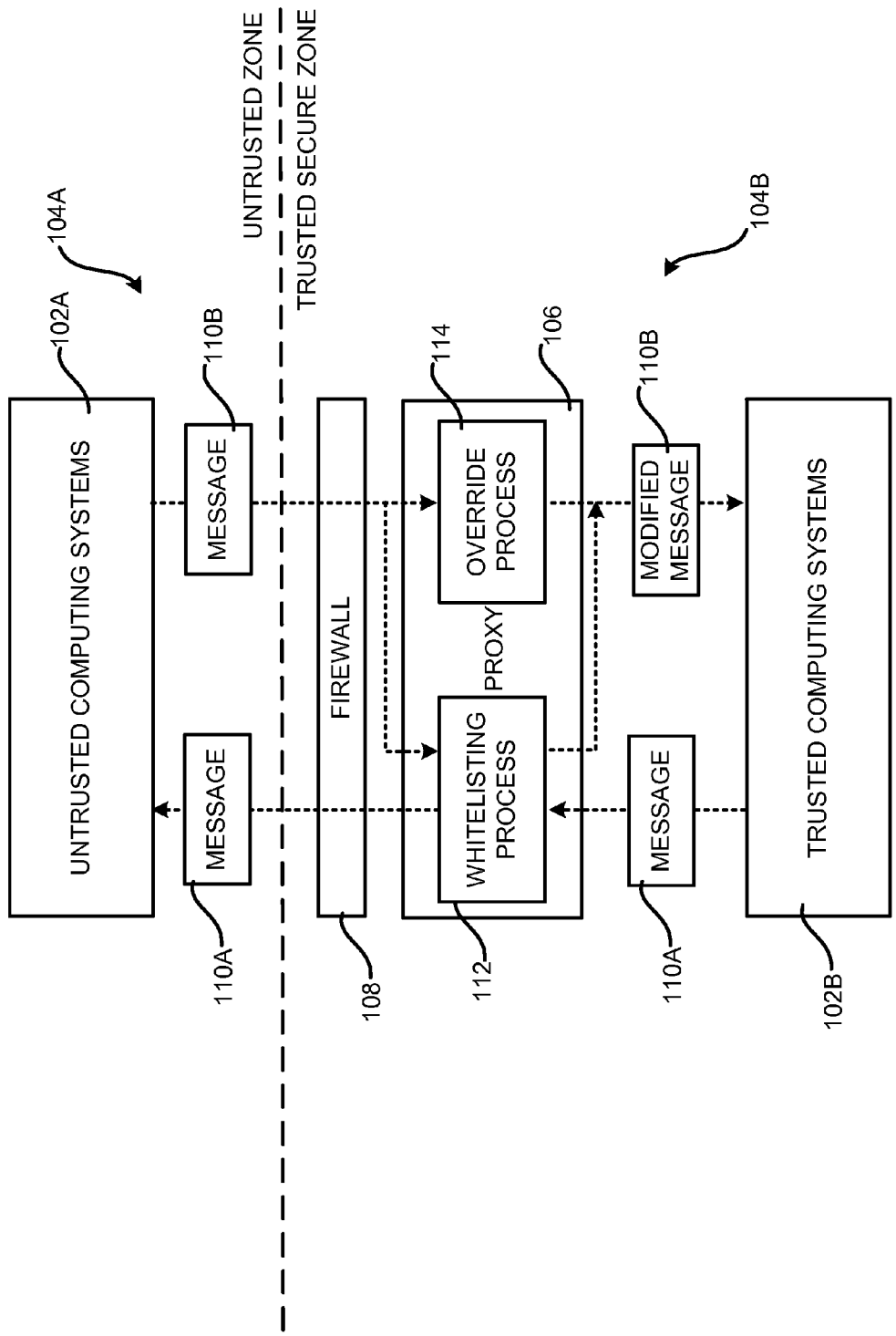
FIG. 1 is a system diagram showing a high-level overview of one mechanism disclosed herein for secure inter-zone data communication, according to one embodiment disclosed herein.

The following detailed description is directed to technologies for secure inter-zone data communication. Through an implementation of the concepts and technologies disclosed herein, computing systems operating within a trusted secure zone can utilize services provided by computing systems outside the trusted secure zone without requiring the duplication of services within the trusted secure zone and without compromising the security of the trusted secure zone. For instance, computing systems operating within the trusted secure zone might utilize services provided by computing systems in an untrusted zone for infrastructure management, such as asset provisioning and configuration. Assets include, but are not limited to, computing devices and user accounts.

According to aspects presented herein, a proxy provides functionality for enabling computing systems within a trusted secure zone to communicate with computing systems outside the trusted secure zone. The proxy is also configured to allow computing systems outside the trusted secure zone to communicate with computing systems in the trusted secure zone. As will be described in detail below, the proxy operates in a manner designed to minimize the possibility that the security of the trusted secure zone will be compromised through communications with computing systems outside a trusted secure zone.

The proxy disclosed herein is configured for use within a trusted secure zone. As mentioned above, a trusted secure zone includes one or more computing systems configured to perform tasks that require a high level of security and trust. The computing systems in a trusted secure zone might maintain credit card information and perform payment-processing services, for instance. A trusted secure zone is typically secured both physically, through the use of physical access control mechanisms, and electronically, through the use of devices designed to monitor and control incoming and outgoing network traffic. Computing systems operating within a trusted secure zone may be referred to herein as "trusted computing systems."

The proxy disclosed herein is also configured to perform various types of processing on messages directed to or received from computing systems operating outside a trusted secure zone, such as computing systems operating in an untrusted zone. As mentioned above, an untrusted zone does not typically include all the physical and/or network access control mechanisms used in a trusted secure zone. For instance, an organization might maintain a trusted secure zone that is restricted to a very small number of authorized employees and an untrusted zone that includes computing systems that are accessible to a much larger group of employees. Some computing systems in the untrusted zone might also provide various services to other computing systems in the untrusted zone. Computing systems operating in an untrusted zone might be referred to herein as "untrusted computing systems."

When the proxy receives a message from a computing system in a trusted secure zone that is directed to a computing system outside the trusted secure zone, the proxy performs a whitelisting process on the message. In particular, the proxy examines a whitelist to determine whether the message is of a type that is permitted to be transmitted outside the trusted secure zone. If the message is identified in the whitelist, the proxy retransmits the message to the destination computing system in the untrusted zone. If the message is not identified in the whitelist, the proxy does not retransmit the message outside the trusted secure zone. If a message is received that is not in the whitelist, the proxy might generate an alert and/or notify the sending system that transmission of the message has been blocked.

The proxy might also perform a filtering process on messages transmitted from computing systems in a trusted secure zone to computing systems outside the trusted secure zone. For instance, the proxy might examine the content of the message to determine if the message includes data that is not permitted to be transmitted outside the trusted secure zone, such as credit card information. If the message includes data that is not permitted to leave the trusted secure zone, the proxy might strip the data from the message and allow the modified message to be transmitted. Alternately, the proxy might block the transmission of the message entirely. If a message is filtered or blocked, the proxy might generate an alert and/or notify the sending system that the message has been filtered or blocked.

The proxy might also be configured in some embodiments to determine if a message transmitted from a computing system in the trusted secure zone to a computing system in the untrusted zone includes trusted data. As utilized herein, the term "trusted data" refers to data that originates in the trusted secure zone and upon which a security decision may be made. Examples of trusted data include, but are not limited to, a network address, host name, and username of a computing system operating in a trusted secure zone. If a message originating from a computing system in the trusted secure zone includes trusted data, the proxy is configured to store the trusted data for later use in processing messages originating outside the trusted secure zone. The proxy might also provide a user interface for allowing an authorized administrator to generate and store trusted data for later use by the proxy. The user interface might also be utilized to define the whitelist.

When the proxy receives a message originating at a computing system outside the trusted secure zone and directed to a computing system within the trusted secure zone, the proxy examines the message to determine if the message includes any trusted data. If the received message does not include trusted data, the message might be provided to the destination computing system without modification.

If the message received by the proxy from the computing system outside the trusted secure zone includes trusted data, the proxy is configured to determine if the trusted data in the received message matches trusted data previously stored by the proxy. If the trusted data in the message matches previously stored trusted data, the message is provided to the destination computing system in the trusted secure zone without modification.

If, however, the trusted data in the message does not match the previously stored trusted data, the proxy is configured to overwrite the trusted data in the message with the previously stored trusted data. The proxy might also generate an alert message indicating that a message has been received from outside the trusted secure zone that includes invalid trusted data. The proxy may then provide the modified message to the destination computing system in the trusted secure zone. In this manner, messages originating outside a trusted secure zone that contain trusted data can be modified to ensure that the trusted data contained therein is consistent with trusted data maintained by the proxy.

It should be appreciated that the embodiments disclosed herein might be utilized with any type of computer, computing system, device, application program, operating system, or other type of system or component. Accordingly, although the embodiments disclosed herein are primarily presented in the context of a proxy that embodies the concepts disclosed herein for secure inter-zone data communication, the disclosure presented herein is not limited to such an implementation.

It should be also appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 is a system diagram showing a high-level overview of one mechanism for secure inter-zone data communication, according to one embodiment disclosed herein. As shown in FIG. 1, one illustrative operating environment for the technologies disclosed herein includes a trusted secure zone 104B and an untrusted zone 104A. As discussed briefly above, the trusted secure zone 104B includes one or more computing systems 102B that are configured to perform tasks that require a high level of security and trust. The trusted secure zone 104B may be secured physically, through the use of physical access control mechanisms like server cages, electronically-limited physical access, and others. The trusted secure zone 104B might also be secured electronically, such as through the use of devices designed to monitor and control incoming and outgoing network traffic. As an example, the trusted secure zone 104B might be secured from other zones and networks through the use of one or more firewalls 108. Other types of devices might also be utilized to physically and electronically secure the computing systems 102B in the trusted secure zone 104B. Computing systems operating within the trusted secure zone 104B may be referred to individually as a "trusted computing system 102B" or collectively as the "trusted computing systems 102B."

The untrusted zone 104A is a group of computing systems 102A that does not typically include all the physical and network access control mechanisms used in the trusted secure zone 104B. For instance, an organization might maintain a trusted secure zone 104B that is physically and logically restricted to a very small number of authorized employees and an untrusted zone 104A that includes computing systems 102A that are accessible to a much larger group of employees.

Computing systems operating in the untrusted zone 104A might be referred to individually as a "untrusted computing system 102A" or collectively as the "untrusted computing systems 102A." In this regard, it should be appreciated that the untrusted computing systems 102A are not typically operated in an insecure or untrustworthy manner. Rather, the untrusted computing systems 102A are operated in a manner that is less secure than the computing systems 102B operating in the trusted secure zone 104B. Thus, from the perspective of the computing systems 102B operating in the trusted secure zone 104B, the computing systems 102A in the untrusted zone 104A may be considered to be untrustworthy.

Some of the computing systems 102A in the untrusted zone 104A might provide various infrastructure services, data stores, mass storage facilities, and other types of functionality to other computing systems operating in the untrusted zone 104A. For example, one or more of the computing systems 102A operating within the untrusted zone 104A might provide various services for asset provisioning and configuration. Assets include, but are not limited to, computing devices and user accounts.

As one example, the computing systems 102A might maintain datastores containing information regarding the configuration of various server computers operating in the untrusted zone 104A (which may be referred to herein as "hosts"), information regarding the various users of the hosts and their access privileges, and other data. The computing systems 102A might also provide other types of services.

It may be desirable for the trusted computing systems 102B operating within the trusted secure zone 104B to utilize some or all of the services provided by the untrusted computing systems 102A operating within the untrusted zone 104A. Due to the highly sensitive nature of the computing operations performed within the trusted secure zone 104B, it can be difficult to enable this functionality in a manner that does not compromise the security of the trusted secure zone 104B. As mentioned briefly above, one mechanism utilized to provide this functionality involves duplicating services provided by the untrusted computing systems 102A within the trusted secure zone 104B. Data related to the operation of the services is then periodically synchronized from the computing systems 102B operating in the trusted secure zone 104B to the computers operating in the untrusted zone 104A. This mechanism, however, may be undesirable because it creates duplicate services in both the trusted secure zone 104B and the untrusted zone 104A, makes operating the trusted secure zone 104B more complex, and may involves the sometimes complex synchronization of data from the trusted secure zone 104B to the untrusted zone 104A.

The embodiments disclosed herein provide a mechanism for allowing the trusted computing systems 102B operating within the trusted secure zone 104B to utilize services provided by the untrusted computing systems 102A outside the trusted secure zone 104B without requiring the duplication of the services in the trusted secure zone 104B and without compromising the security of the trusted secure zone 104B. For instance, the trusted computing systems 102B operating within the trusted secure zone 104B might utilize services provided by the untrusted computing systems 102A in the untrusted zone 104A for infrastructure management, such as asset provisioning and configuration. The trusted computing systems 102B operating within the trusted secure zone 104B might also utilize other types of services provided by the untrusted computing systems 102A in the untrusted zone 104A utilizing the mechanisms disclosed herein.

In order to provide the functionality described above, a proxy 106 is utilized in the embodiments disclosed herein. The proxy 106 may be a general-purpose computer that is configured to provide the functionality disclosed herein. The proxy 106 might also be a specific-purpose hardware device configured to perform the functionality disclosed herein. Other devices, such as the firewall 108 or another type of computing device, might also provide the functionality disclosed herein as being provided by the proxy 106. In this regard, it should be appreciated that the implementations disclosed herein are merely illustrative and that the functionality provided by the proxy 106 might be implemented in other ways by other types of devices.

As illustrated in FIG. 1, the proxy 106 is located within the trusted secure zone 104B. As will be described in greater detail below, the proxy 106 is configured to receive and process messages, such as the message 110A, generated by the trusted computing systems 102B and directed to computers outside the trusted secure zone 104B, such as one or more of the untrusted computing systems 102A. The proxy 106 also processes messages, such as the message 110B, generated by computing systems outside the trusted secure zone 104B and directed to one or more of the trusted computing systems 102B. Additional details regarding the processing performed by the proxy 106 are provided below.

As illustrated in FIG. 1, the proxy 106 is configured to perform a whitelisting process 112 on messages, such as the message 110A, received from the trusted computing systems 102B that have a destination outside the trusted secure zone 104B. As will be described in greater detail below, the whitelisting process 112 involves examining a whitelist maintained by the proxy 106 to determine whether the message 110A is of a type that is permitted to be transmitted outside the trusted secure zone 104B. If the message 110A is identified in the whitelist as being permitted, the proxy 106 passes the message 110A to the destination computing system, such as one of the untrusted computing systems 102A in the untrusted zone 104A. If, however, the message 110A is not identified in the whitelist maintained by the proxy 104A, the proxy 106 does not retransmit the message 110A outside the trusted secure zone 104B In some embodiments, the proxy 106 might also perform a filtering process on messages, such as the message 110A, transmitted from trusted computing systems 102B in the trusted secure zone 104B to destination computing systems outside the trusted secure zone 104B, such as the untrusted computing systems 102A in the untrusted zone 104A. For instance, the proxy 106 might examine the content of a message 110A to determine if the message 110A includes data that is not permitted to be transmitted outside the trusted secure zone 104B, such as credit card or other sensitive or confidential information. If the message 110A includes data that is not permitted to leave the trusted secure zone 104B, the proxy 106 might strip the data from the message 110A and transmit the modified message to its destination. Alternatively, the proxy 106 might block the transmission of the message 110A entirely.

The proxy 106 might also be configured in some embodiments to determine if a message, such as the message 110A, transmitted from a trusted computing system 102B in the trusted secure zone 104B to a computing system outside the trusted secure zone 104B includes trusted data. As mentioned above, "trusted data" is data that originates in the trusted secure zone 104B and upon which a security decision may be made. Examples of trusted data include, but are not limited to, a network address, host name, and username of a trusted computing system 102B operating in the trusted secure zone 104B. Another example of trusted data is data relating to the configuration of users of the trusted computing systems 102B, such as data identifying the hosts that a user is permitted to access.

If a message originating from a trusted computing system 102B in the trusted secure zone 104B includes trusted data, the proxy 106 is configured to store the trusted data for later use by an override process 114. In some embodiments, the proxy 106 also provides a user interface for allowing an authorized administrator to generate and store trusted data for later use by the proxy 106. Additional details regarding the processing of messages 110A originating within the trusted secure zone 104B are provided below with regard to FIGS. 2-3.

As mentioned briefly above, the proxy 106 is also configured to process messages, such as the message 110B, generated by computing systems outside the trusted secure zone and destined for one or more of the trusted computing systems 102B. In particular, the proxy 106 is configured in embodiments to perform the whitelisting process 112 on incoming messages 110B. If incoming messages 110B are not identified in a whitelist, the messages 110B are not transmitted to the destination trusted computing system 102B.

The proxy 106 might also be configured to perform an override process 114 on messages, such as the message 110B, that originate outside the trusted secure zone 104B. In order to perform the override process 114, the proxy 106 examines the incoming message 110B to determine if the message 110B includes trusted data. If the received message 110B does not include trusted data, the proxy 106 may provide the message 110B to the destination computing system within the trusted secure zone 104B without modification.

If, however, the message 110B received by the proxy 106 from the computing system outside the trusted secure zone 104B includes trusted data, the proxy 106 is configured to determine if the trusted data in the received message 110B matches trusted data previously stored by the proxy 106. As mentioned above, the proxy 106 might store the trusted data identified in a message 110A transmitted from the trusted computing systems 102B to a destination outside the trusted secure zone 104B.

If the trusted data in the incoming message 110B matches trusted data previously stored by the proxy 106, the message 110B is provided to the destination trusted computing system 102B in the trusted secure zone 104B without modification. If, however, the trusted data in the incoming message 110B does not match the previously stored trusted data, the proxy 106 is configured to overwrite the trusted data in the message 110B with the trusted data previously stored by the proxy 106. The proxy 106 might also generate an alert message indicating that a message 110B has been received from outside the trusted secure zone 104B that includes invalid trusted data.

The proxy 106 may then provide a modified message 110B to the destination trusted computing system 102B in the trusted secure zone 104B. In this manner, the proxy 106 can modify messages that originate outside the trusted secure zone 104B and that contain trusted data to ensure that the trusted data contained therein is consistent with trusted data maintained by the proxy 106 and utilized to make security decisions. Additional details regarding the processing of messages originating outside the trusted secure zone 104B will be provided below with regard to FIGS. 4-5.

It should be appreciated that, in some embodiments, the proxy 106 is configured as a "transparent" proxy. A transparent proxy is a proxy that does not require applications executing on the trusted computing systems 102B to be modified. The proxy 106 can receive and process messages 110A from the trusted computing systems 102B without modification of the systems 102B or the applications that execute on the systems 102B. In other embodiments, the proxy 106 might require modification of the applications that execute on the trusted computing systems 102B.

It should be appreciated that the mechanisms illustrated in FIG. 1, and the other FIGURES presented herein, have been simplified for discussion purposes. In this regard, it should also be appreciated that many more networks, networking devices, computing systems, software components, and other types of software and hardware may be utilized to implement the embodiments disclosed herein than illustrated. Additionally, it should be appreciated that the messages flowing between the computing systems described herein might be encrypted in various ways. For instance, digital signatures might be utilized to sign and encrypt the various messages described herein. Other mechanisms might also be utilized to secure the content of messages flowing to and from the trusted secure zone 104B.

Figure 2:
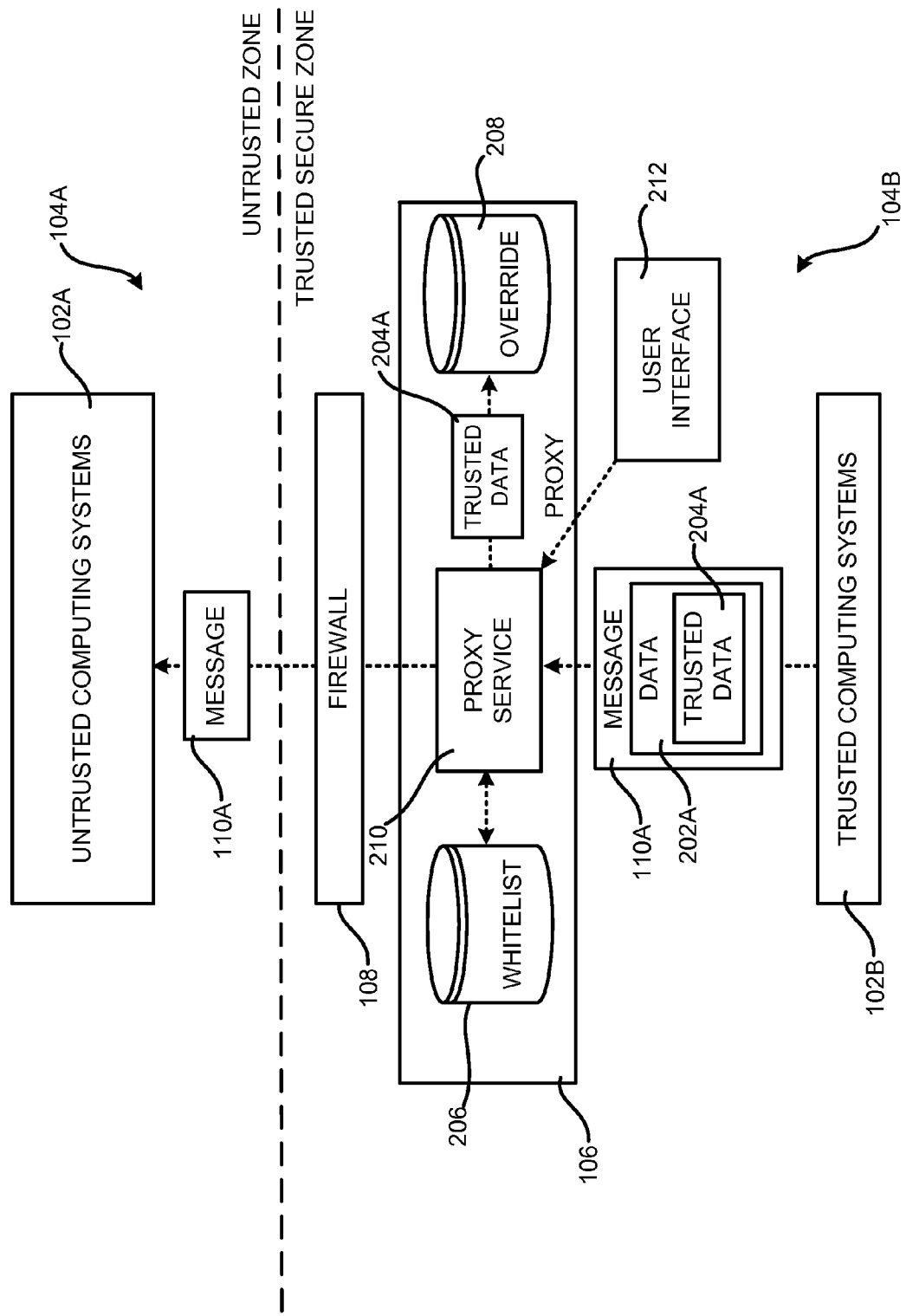
FIG. 2 is a system diagram showing aspects of one mechanism disclosed herein for processing a message transmitted from a computing system within a trusted secure zone to a computing system outside the trusted secure zone, according to one embodiment disclosed herein.

FIG. 2 is a system diagram showing aspects of one mechanism disclosed herein for processing a message 110A transmitted from a computing system 102B within a trusted secure zone 104B to a destination outside the trusted secure zone 104B, such as a computing system 102A in the untrusted zone 104A, according to one embodiment disclosed herein. In the embodiment shown in FIG. 2, the proxy 106 is configured to execute a proxy service 210. The proxy service 210 is a software component that receives and processes messages in the manner described herein. For example, the proxy service 210 might perform the whitelisting process 112 described with regard to FIGS. 2-3, the override process 114 described with regard to FIGS. 4-5, and potentially provide other functionality.

As mentioned above, the proxy service 210 receives messages, such as the message 110A, that are transmitted by trusted computing systems 102B and that are destined for computing systems outside the trusted secure zone 104B. The messages may be any type of message that can be transmitted between two computer systems. For example, the message 110A may be a call to a service exposed by one of the untrusted computing systems 102A.

When the proxy service 210 receives a message 110A, the proxy service 210 performs the whitelisting process 112 on the received message 110A. In order to perform this process, the proxy service 210 searches a whitelist data store 206 to determine whether the message 110A is permitted to be transmitted outside the trusted secure zone 104B. The whitelist data store 206 includes a whitelist that identifies those message types that are permitted to be transmitted outside the trusted secure zone 104B. An administrator of the proxy 106 might specify the contents of the whitelist data store 206, thereby indicating the various message types that are permitted to be transmitted outside the trusted secure zone 104B.

If the proxy service 210 identifies the message 110A in the whitelist data store 206, the proxy service 210 passes the message 110A to the destination computing system, such as one of the untrusted computing systems 102A in the untrusted zone 104A. If, however, the proxy service 210 cannot identify the message 110A in the whitelist data store 206, the proxy service 210 will not retransmit the message 110A outside the trusted secure zone 104B. The proxy service 210 might also generate an alert message to an administrator of the proxy service 210 and/or generate an error message to the sender of the received message 110A indicating that the message has not been retransmitted.

As mentioned above, the proxy service 210 might also perform filtering on the contents of a message 110A. In particular, the proxy service 210 might examine the message 110A to determine if the message 110A includes data 202A that is not permitted to be transmitted outside the trusted secure zone 104B, such as sensitive or confidential information. If the message 110A includes data 202A that is not permitted to leave the trusted secure zone 104B, the proxy service 210 might strip the data 202A from the message 110A and transmit the modified message to its destination. Alternatively, the proxy service 210 might block the transmission of the message 110A entirely. The proxy service 210 might also generate an alert message to an administrator of the proxy service 210 and/or generate an error message to the sender of the received message 110A indicating that the message has been filtered or blocked.

As also mentioned above, the proxy service 210 is also configured to identify and store trusted data 204A that is identified within messages 110A that are transmitted by trusted computing systems 102B and destined for computing systems outside the trusted secure zone 104B. As defined previously, trusted data 204A is data that originates from within the trusted secure zone 104B and that is utilized when making security decisions within the trusted secure zone 104B.

In one specific implementation, for instance, the message 110A is a call to a service provided by one of the untrusted computing systems 102A for provisioning a new computing device in the trusted secure zone 104B. In this example, the message 110A includes data 202A describing various aspects of the new computing device. For instance, the data 202A might include data describing the amount of memory the new computing device has, the size of a hard disk in the new computing device, the network address of the new device, and the host name of the new device. Of this data 202A, only the network address and host name of the new device may be utilized when making security decisions. Accordingly, this data is considered the trusted data 204A in this example. Other types of data might be considered trusted data 204A in other types of messages 110A.

In order to identify the trusted data 204A in a particular message 110A, the proxy 106 might be provisioned with data that describes the format of various types of messages 110 and that identifies the location of the trusted data 204A within the messages. In other implementations, pattern matching might be utilized to identify the trusted data 204A in a message 110A. The proxy service 210 might also utilize other mechanisms in order to identify trusted data 204A within messages originating within the trusted secure zone 104B.

Once the proxy service 210 has identified trusted data 204A in a message 110A originating within the trusted secure zone 104B, the proxy service 210 stores the trusted data 204A in a data store, such as the override data store 208. As will be described in greater detail below, the proxy service 210 might utilize the trusted data 204A stored in the override data store 208 to modify the content of incoming messages that include trusted data that is inconsistent with the stored trusted data 204A. Additional details regarding the override process 114 are provided below with regard to FIGS. 4-5.

As shown in FIG. 2, the proxy service 210 provides a user interface 212 in some embodiments through which an authorized administrator of the proxy 106 can supply trusted data for storage in the override data store 208. For example, the user interface 212 might be utilized to provision a user by providing trusted data that identifies a user that is authorized to access the trusted computing systems 102B in the trusted secure zone 104B. The user interface 212 might also be utilized to submit other types of trusted data for inclusion in the override data store 208. As mentioned above, the user interface 212 might also be utilized to define the contents of the whitelist data store 206. The computing system providing the user interface 212 might be located in a physically secure area accessible only to authorized administrators.

It should be appreciated that the whitelist data store 206 and the override data store 208 may be implemented utilizing any suitable technology. For instance, these data stores might be implemented as relational databases, non-relational databases, in-memory caches, files stored on disk, or any other suitable manner. In this regard, it should also be appreciated that the whitelist data store 206 and the override data store 208 may be securely located outside the trusted secure zone 104B in some embodiments. Other implementations might also be utilized.

Figure 3:
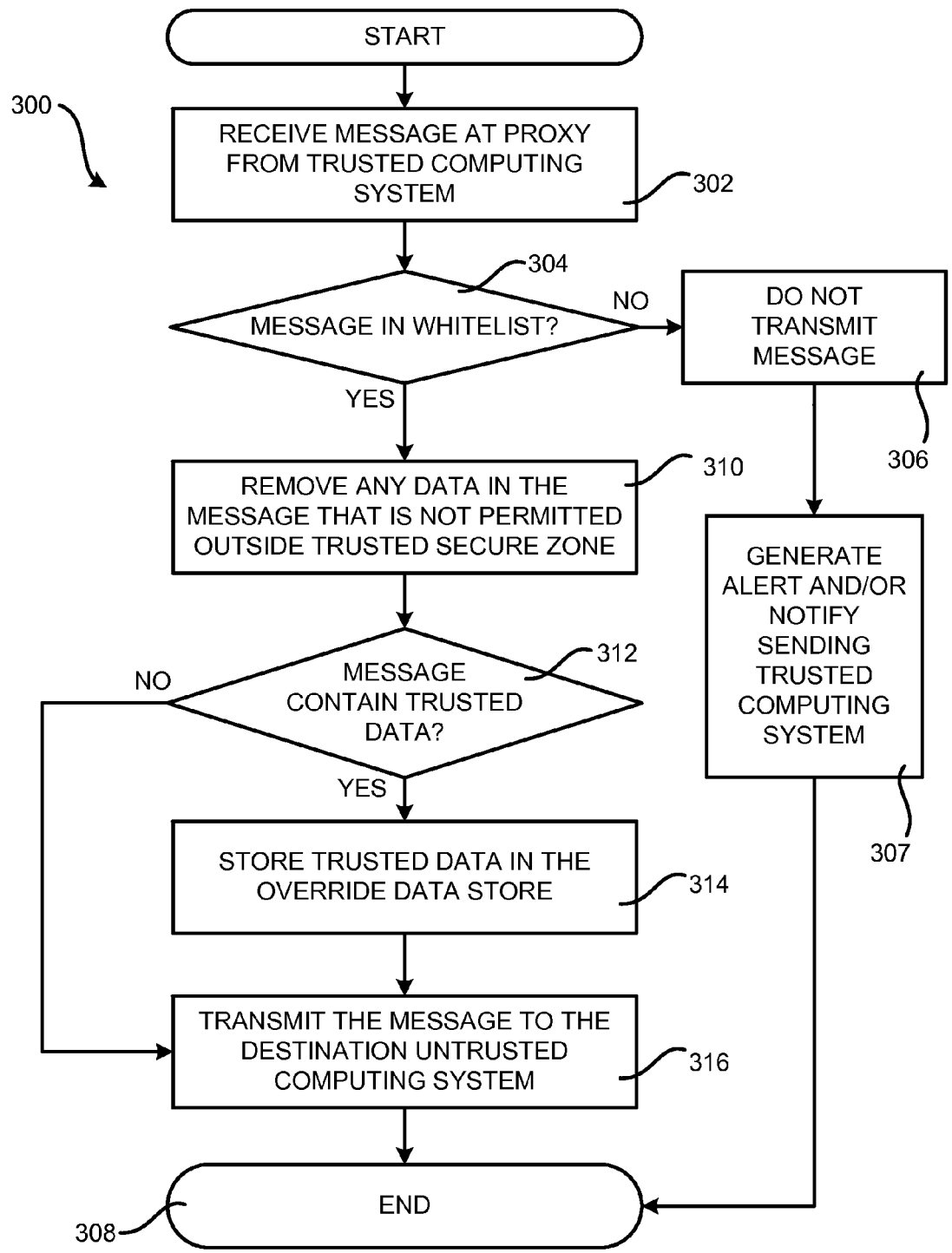
FIG. 3 is a flow diagram showing aspects of one illustrative routine for processing a message transmitted from a computing system within a trusted secure zone to a computing system outside the trusted secure zone, according to one embodiment disclosed herein.

Turning now to FIG. 3, additional details will be provided regarding the embodiments described herein for secure inter-zone data communication. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 3 is a flow diagram showing aspects of one illustrative routine 300 for processing a message 110A transmitted from a computing system 102B within a trusted secure zone 104B to a computing system outside the trusted secure zone 104B, such as an untrusted computing system 102A in the untrusted zone 104A, according to one embodiment disclosed herein. The routine 300 begins at operation 302, where the proxy service 210 receives a message 110A from one of the trusted computing systems 102B.

In response to receiving the message 110A, the routine 300 proceeds to operation 304, where the proxy service 210 determines whether the messages 110A is identified in the whitelist data store 206. If the message 110A is not identified in the whitelist data store 206, the routine 300 proceeds from operation 304 to operation 306. At operation 306, the proxy service 210 denies the request to transmit the message 110A to a destination outside the trusted secure zone 104B.

At operation 307, the proxy service 210 might also provide a response to the trusted computing system 102B indicating that transmission of the message 110A has been blocked. The proxy service 210 might also provide an alert to an administrator of the proxy 106 indicating that a message 110A not in the whitelist was received. For example, an e-mail message, short messaging service ("SMS") message, social networking service message, or another type of message might be transmitted to an administrator of the proxy 106. An entry in a log file might also be made indicating the receipt of a message 110A not identified in the whitelist data store 206. The proxy service 210 might also take other actions in response to receiving a message 110A that is not identified in the whitelist data store 206. From operation 307, the routine 300 proceeds to operation 308, where it ends.

If, at operation 304, the proxy service 210 determines that the message 110A is identified in the whitelist data store 206, the routine 300 proceeds from operation 304 to operation 310. At operation 310, the proxy service 210 might filter the content of the message 110A to remove any data that is not permitted to exit the trusted secure zone 104B, such as credit card information. The proxy service 210 might also filter other types of data from the message 110A. If data is filtered from the message 110A, the proxy service 210 might generate an alert to an administrator and/or inform the sender of the message 110A that the filtering has taken place.

From operation 310, the routine 300 proceeds to operation 312, where the proxy service 210 determines whether the message 110A includes trusted data 204A in the manner described above. If the message does not contain trusted data 204A, the routine 300 proceeds from operation 312 to operation 316, where the proxy service 210 transmits the message 110A to its destination without further processing. If, however, the message 110A does include trusted data 204A, the routine 300 proceeds from operation 312 to operation 314.

At operation 314, the proxy service 210 extracts the trusted data 204A from the message 110A and stores the trusted data 204A in the override data store 208. The trusted data 204A might be encrypted prior to storage in the override data store 208. As will be described in detail below with regard to FIGS. 4-5, the proxy service 210 might utilize the stored trusted data 204A when processing messages incoming to the trusted secure zone 104B. From operation 314, the routine 300 proceeds to operation 316, where the proxy service 210 transmits the message 110A to the destination computing system outside the trusted secure zone 104B. The routine 300 then proceeds to operation 308, where it ends.

Figure 4:
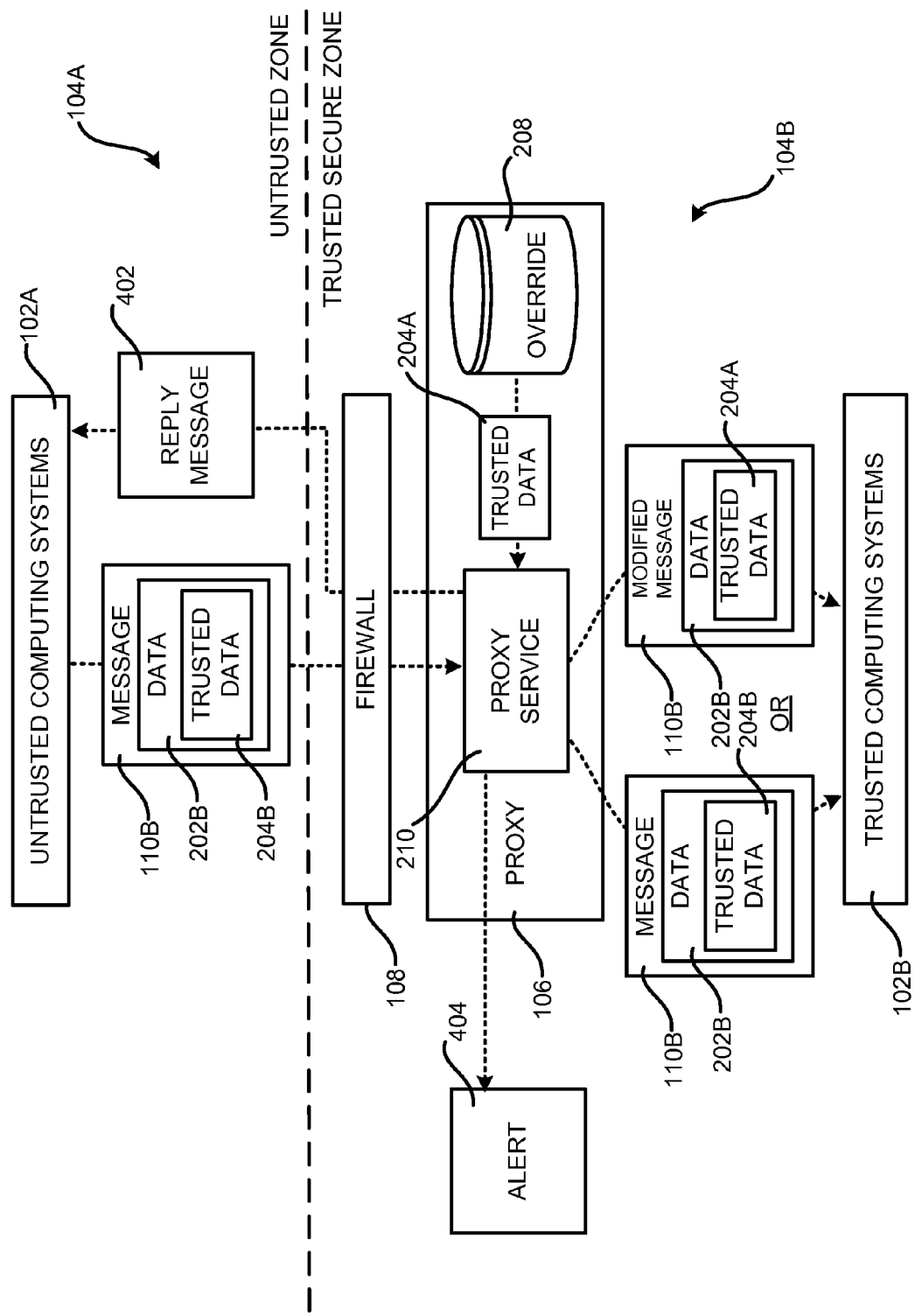
FIG. 4 is a system diagram showing aspects of one mechanism disclosed herein for processing a message transmitted from a computing system outside a trusted secure zone to a computing system in a trusted secure zone, according to one embodiment disclosed herein.

FIG. 4 is a system diagram showing aspects of one mechanism disclosed herein for processing a message 110B transmitted from a computing system 102A outside the trusted secure zone 104B to one or more computing systems 102B in the trusted secure zone 104B, according to one embodiment disclosed herein. As shown in FIG. 4, one of the untrusted computing systems 102A might transmit a message 110B to one or more of the trusted computing systems 102B in the trusted secure zone 104B. The message 110B might include data 202B, some of which might be trusted data 204B. The message 110B might be a reply to the message 110A, described above, or might be another type of message.

The proxy service 210 executing on the proxy 106 receives the message 110B from the sender. As mentioned above, the proxy 106 might perform the whitelisting process 112 on messages 110B received from an untrusted computing system 102A. If the message 110B is not identified in the whitelist, the incoming message 110B will not be retransmitted to its destination. A reply message 402 might be provided to the sending untrusted computing system 102A indicating that transmission of the incoming message 110B has been blocked. An alert 404 might also be generated to an administrator of the proxy 106 indicating that the incoming message 110B was blocked.

The proxy service 210 might also examine the message 110B to identify any trusted data 204B in the message 110B. As discussed above, various mechanisms might be utilized to identify the trusted data 204B in the message 110B. For example, the proxy 106 might be provisioned with data that describes the format of various types of messages 110 and that identifies the location of the trusted data 204B within the message 110B. Pattern matching and/or other mechanisms might also be utilized to identify the trusted data 204B in a message 110B originating outside the trusted secure zone 104B.

If the proxy service 210 determines that an incoming message 110B includes trusted data 204B, the proxy service 210 compares the trusted data 204B to trusted data 204A previously stored in the override data store 208. As discussed above, the trusted data 204A might be stored in the override data store 208 in response to receiving a message 110A originating from within the trusted secure zone 104B. The trusted data 204A might also be stored in the override data store 208 using the user interface 212 described above with regard to FIG. 2. Other mechanisms might also be utilized to store the trusted data 204A in the override data store 208.

If the proxy service 210 determines that the trusted data 204B in the message 110B matches the previously stored trusted data 204A, the proxy service 210 transmits the message 110B to the destination trusted computing system 102B without modification. If, however, the proxy service 210 determines that the trusted data 204B in the message 110B does not match the previously stored trusted data 204A, the proxy service 210 overwrites the trusted data 204B in the message 110B with the trusted data 204A. In this manner, the proxy service 210 can replace the trusted data 204B in an incoming message 110B that is inconsistent with the trusted data 204A stored in the override data store 208. The proxy service 210 might also generate an alert message 404 to an administrator of the proxy 106 indicating that a message 110B was received containing invalid trusted data 204B. The proxy service 210 then transmits the modified message 110B containing the trusted data 204A to the destination computing system. Additional details regarding this process will be provided below with regard to FIG. 5.

In one implementation, the message 110B is a response to a request message 110A generated by one of the trusted computing systems 102B for a list of all of the hosts in a particular class. In this example, trusted data 204A will have been previously stored following provisioning requests generated by one or more of the trusted computing systems 102B that identifies the hosts in the class. If the trusted data 204B in the message 110B identifying the hosts in the class does not match the trusted data 204A stored in the override data store 208 that identifies the hosts in the class, the trusted data 204A in the override data store 208 will be used to overwrite the trusted data 204B. In this manner, the hosts in a class defined by the trusted data 208 will be included in the message 110B transmitted to the destination trusted computing system 102B.

Figure 5:
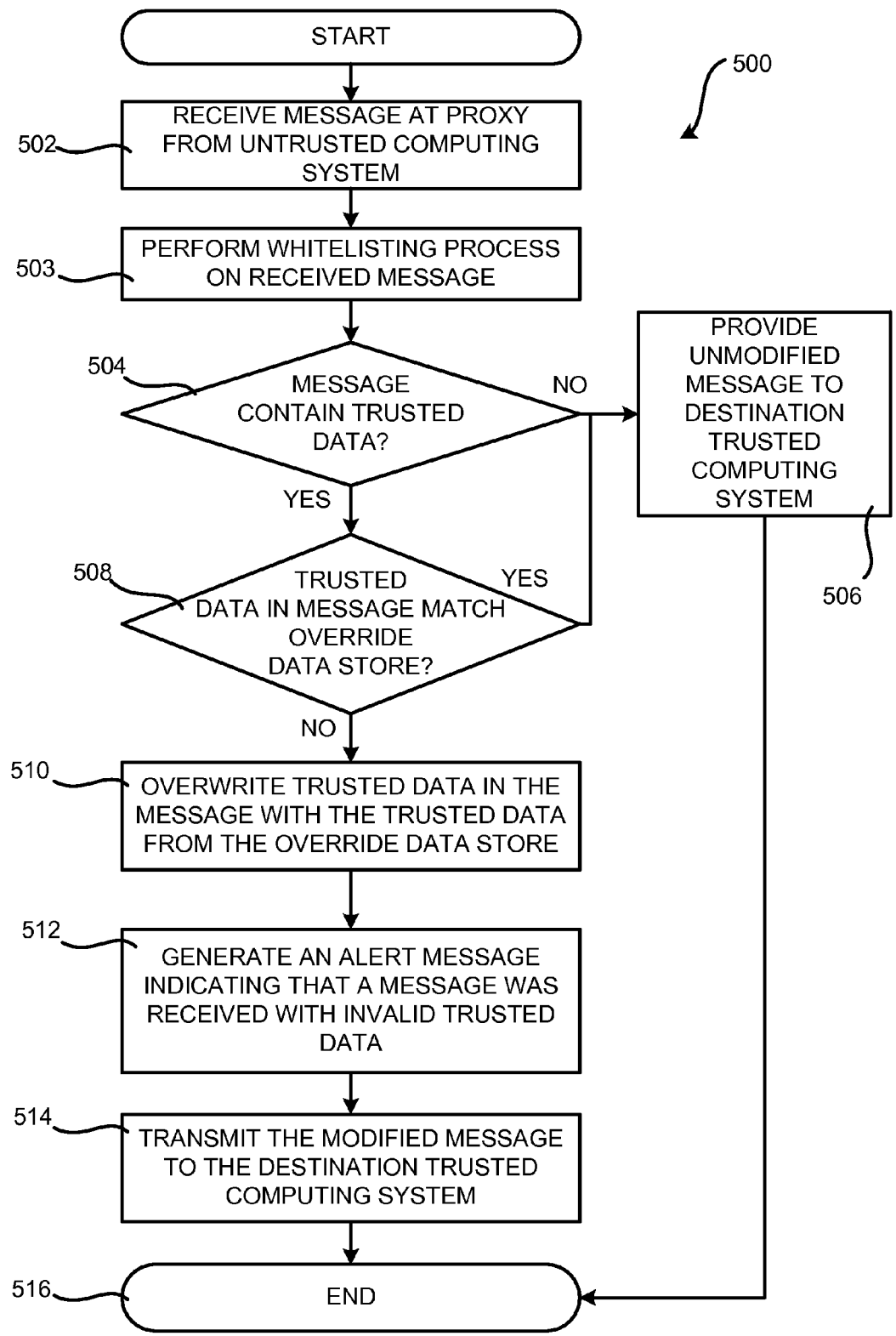
FIG. 5 is a flow diagram showing aspects of one illustrative routine for processing a message transmitted from a computing system outside a trusted secure zone to a computing system in a trusted secure zone, according to one embodiment disclosed herein.

FIG. 5 is a flow diagram showing aspects of one illustrative routine 500 for processing a message 110B transmitted from a computing system 102A outside the trusted secure zone 104B to a computing system 102B in the trusted secure zone 104B, according to one embodiment disclosed herein. The routine 500 begins at operation 502, where the proxy service 210 receives a message 110B generated by a computing system 102A outside the trusted secure zone 104B and destined for a computing system 102B inside the trusted secure zone 104B.

In response to receiving the message 110B, the routine 500 proceeds from operation 502 to operation 503. At operation 503, the proxy service 210 performs the whitelisting process 112 described above on the incoming message 110B. If the message 110B is not identified in the whitelist, the message 110B will not be retransmitted to its destination. Additionally, an alert message 404 might be generated to an administrator of the proxy 106. A reply message 402 might also be provided to the sending indicating that the message 110B was blocked. From operation 503, the routine 500 proceeds to operation 504.

At operation 504, the proxy service 210 determines whether the received message contains trusted data 204B in the manner described above. If the message 110B does not include trusted data 204B, the routine 500 proceeds from operation 504 to operation 506, where the proxy service 210 transmits the message 110B to the destination computing system 102B without modification. From operation 506, the routine 500 proceeds to operation 516, where it ends.

If, at operation 504, the proxy service 210 determines that the message 110B does include trusted data 204B, the routine 500 proceeds from operation 504 to operation 508. At operation 508, the proxy service 210 determines whether the trusted data 204B in the received message 110B matches the trusted data 204A previously stored in the override data store 208. If the trusted data 204B matches the trusted data 204A, the routine 500 proceeds from operation 508 to operation 506, where the message 110B is provided to the destination computing system 102B without modification.

If, however, the trusted data 204B does not match the trusted data 204A, the routine 500 proceeds from operation 508 to operation 510. At operation 510, the proxy service 210 overwrites the trusted data 204B in the incoming message 110B with the trusted data 204A stored in the override data store 208. The proxy service 210 then transmits the modified message 110B containing the trusted data 204A to the destination computing system 102B at operation 514.

The proxy service 210 might also generate an alert message at operation 512 indicating that a message 110B was received from a source outside the trusted secure zone 140B with trusted data 204B that is inconsistent with the contents of the override data store 208. For example, an e-mail message, SMS message, social networking service message, or another type of message might be transmitted to an administrator of the proxy 106. An entry in a log file might also be made indicating the receipt of inconsistent trusted data 204B. From operation 514, the routine 500 proceeds to operation 516, where it ends.

Figure 6:
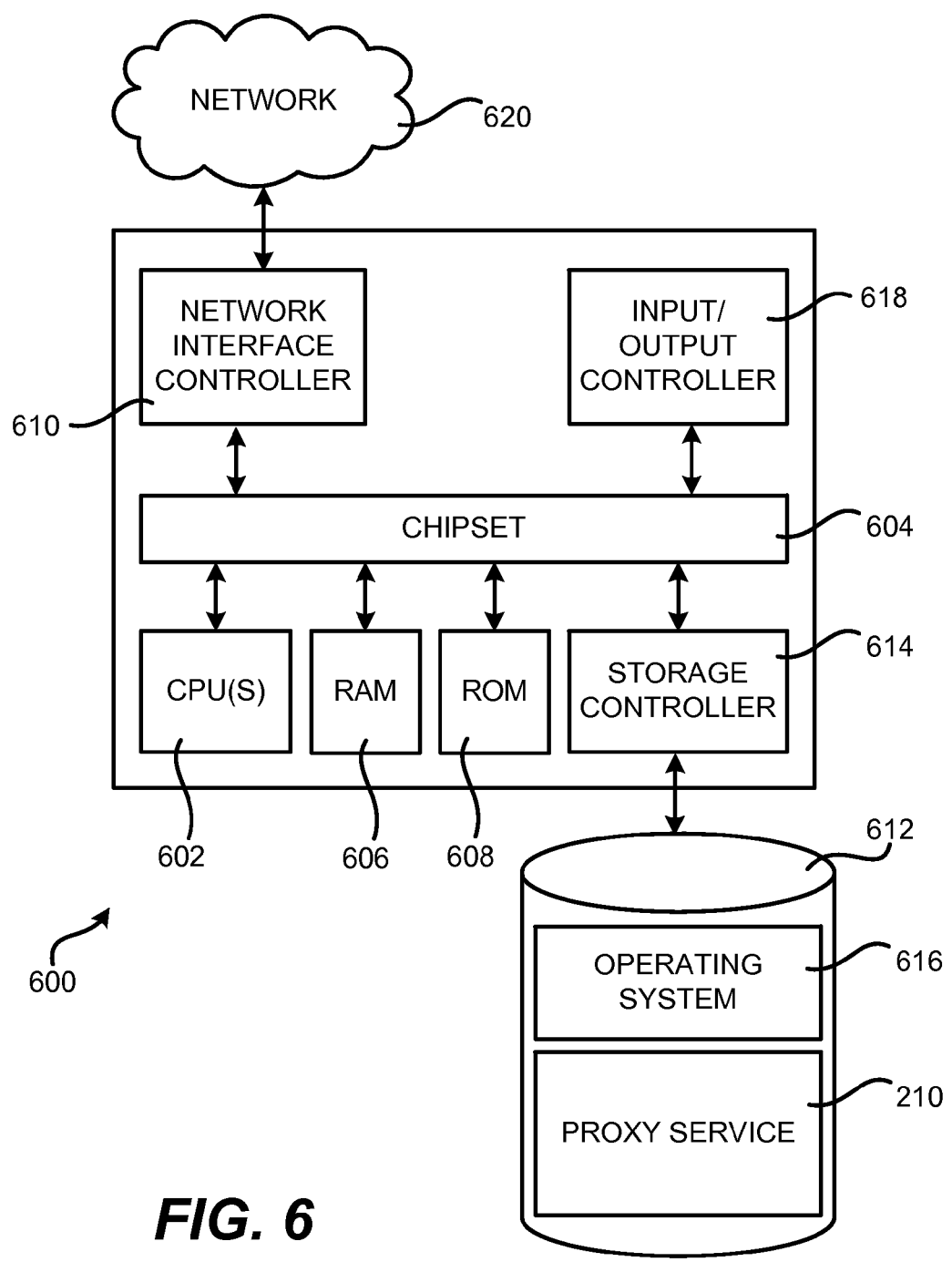
FIG. 6 is a computer architecture diagram showing one illustrative computer hardware architecture for use in computing devices configured to implement the concepts and technologies disclosed herein in one embodiment.

FIG. 6 shows an example computer architecture for a computer 600 capable of executing software components for performing some or all of the functionality described herein for secure inter-zone data communication. The computer architecture 600 shown in FIG. 6 illustrates a conventional server computer, workstation, desktop computer, laptop, PDA, electronic book reader, digital wireless phone, tablet computer, network appliance, set-top box, or other computing device, and may be utilized to execute any aspects of the software components presented herein and described as executing on the proxy 106, the untrusted computing systems 102A, the trusted computing systems 102B, or other computing system described herein.

The computer 600 includes a baseboard, or "motherboard," which is a printed circuit board to which a multitude of components or devices may be connected by way of a system bus or other electrical communication paths. In one illustrative embodiment, one or more central processing units ("CPUs") 602 operate in conjunction with a chipset 604. The CPUs 602 are standard programmable processors that perform arithmetic and logical operations necessary for the operation of the computer 600.

The CPUs 602 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 604 provides an interface between the CPUs 602 and the remainder of the components and devices on the baseboard. The chipset 604 may provide an interface to a random access memory ("RAM") 606, used as the main memory in the computer 600. The chipset 604 may further provide an interface to a computer-readable storage medium such as a read-only memory ("ROM") 608 or non-volatile RAM ("NVRAM") for storing basic routines that that help to startup the computer 600 and to transfer information between the various components and devices. The ROM 608 or NVRAM may also store other software components necessary for the operation of the computer 600 in accordance with the embodiments described herein.

According to various embodiments, the computer 600 may operate in a networked environment using logical connections to remote computing devices and computer systems through a network 620, such as a local-area network ("LAN"), a wide-area network ("WAN"), the Internet, or any other networking topology known in the art that connects the computer 600 to remote computers. The chipset 604 includes functionality for providing network connectivity through a network interface controller ("NIC") 610, such as a gigabit Ethernet adapter. It should be appreciated that multiple NICs 610 may be present in the computer 600, connecting the computer to other types of networks and remote computer systems.

The computer 600 may be connected to a mass storage device 612 that provides non-volatile storage for the computer. The mass storage device 612 may store system programs, application programs, other program modules, and data, which have been described in greater detail herein. The mass storage device 612 may be connected to the computer 600 through a storage controller 614 connected to the chipset 604. The mass storage device 612 may consist of one or more physical storage units. The storage controller 614 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 600 may store data on the mass storage device 612 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 612 is characterized as primary or secondary storage, or the like.

For example, the computer 600 may store information to the mass storage device 612 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the mass storage device 612 by detecting the physical states or characteristics of one or more particular locations within the physical storage units.

In addition to the mass storage device 612 described above, the computer 600 might have access to other computer-readable media to store and retrieve information, such as program modules, data structures, or other data. It should be appreciated by those skilled in the art that computer-readable media can be any available media that may be accessed by the computer 600, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 612 may store an operating system 616 utilized to control the operation of the computer 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 612 may store other system or application programs and data utilized by the computer 600. For instance, when utilized to implement the proxy 106, the mass storage device 612 might store the proxy service 210 for performing the operations described above. The mass storage device 612 might also store other types of programs and data.

In one embodiment, the mass storage device 612 or other computer-readable storage media may be encoded with computer-executable instructions that, when loaded into the computer 600, transform the computer from a general-purpose computing system into a special-purpose computer capable of implementing the embodiments described herein. These computer-executable instructions transform the computer 600 by specifying how the CPUs 602 transition between states, as described above. According to one embodiment, the computer 600 has access to computer-readable storage media storing computer-executable instructions that, when executed by the computer, perform the various routines and operations described herein.

The computer 600 may also include an input/output controller 618 for receiving and processing input from a number of input devices, such as a keyboard, a mouse, a touchpad, a touch screen, an electronic stylus, or other type of input device. Similarly, the input/output controller 618 may provide output to a display device, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for secure inter-zone data communication have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for enabling data communication between computing systems within a trusted secure zone and computing systems outside the trusted secure zone, the computer-implemented method comprising executing instructions in a computer system to perform the operations of:

receiving a first message, the first message directed from a computing system located within the trusted secure zone to a computing system located outside the trusted secure zone;

determining that the first message contains first trusted data upon which one or more security decisions may be made;

storing the first trusted data in response to determining that the first message includes the first trusted data;

transmitting the first message to the computing system located outside the trusted secure zone;

receiving a second message, the second message directed from the computing system located outside the trusted secure zone to the computing system located within the trusted secure zone;

determining that the second message contains second trusted data;

in response to determining that the second trusted data in the second message is the same as the stored first trusted data, transmitting the second message to the computing system located within the trusted secure zone; and in response to determining that the second trusted data in the second message is not the same as the stored first trusted data, modifying the second message by overwriting the second trusted data in the second message with the stored first trusted data, and transmitting the modified second message to the computing system located within the trusted secure zone.

2. The computer-implemented method of claim 1, further comprising:
   determining that the first message is not identified in a whitelist; and
   in response to determining that the first message is not identified in the whitelist, preventing the first message to be transmitted to the computing system located outside the trusted secure zone.

3. The computer-implemented method of claim 1, further comprising:
   determining that the second message is not identified in a whitelist; and
   in response to determining that the second message is not identified in the whitelist, not transmitting the second message to the computing system located within the trusted secure zone.

4. The computer-implemented method of claim 1, further comprising in response to determining that the second message does not contain second trusted data, transmitting the second message to the computing system located within the trusted secure zone without modification.

5. The computer-implemented method of claim 1, further comprising:
   receiving at least one of the first or second trusted data through a user interface; and
   storing the at least one of the first or second trusted data received through the user interface.

6. The computer-implemented method of claim 5, further comprising:
   receiving a whitelist through the user interface; and
   storing the whitelist in a whitelist data store.

7. The computer-implemented method of claim 1, further comprising generating an alert message in response to determining that the second trusted data in the second message is not the same as the stored first trusted data.

8. The computer-implemented method of claim 2, further comprising generating an alert message in response to determining that the first message is not identified in the whitelist.

9. The computer-implemented method of claim 3, further comprising generating an alert message in response to determining that the second message is not in identified in the whitelist.

10. A non-transitory computer-readable storage medium having computer-executable instructions stored thereupon which, when executed by the computer, cause the computer to:
   receive a message transmitted from an untrusted computing system to a trusted computing system;
   determine that the message contains trusted data;
   in response to determining that the trusted data in the message received from the untrusted computing system matches previously stored trusted data, transmit the message to the trusted computing system; and
   in response to determining that the trusted data in the message received from the untrusted computing system does not match the previously stored trusted data, replace the trusted data in the message received from the untrusted computing system with the previously stored trusted data, and transmit the message containing the previously stored trusted data to the trusted computing system,
   wherein the previously stored trusted data comprises trusted data extracted from a previous message transmitted from the trusted computing system to the untrusted computing system.

11. The computer-readable storage medium of claim 10, wherein extracting the trusted data from the previous message transmitted from the trusted computing system comprises:
   receiving the previous message from the trusted computing system;
   determining that the previous message contains trusted data; and
   extracting and storing the trusted data in response to determining that the previous message includes trusted data.

12. The computer-readable storage medium of claim 10, having further computer-executable instructions stored thereupon which, when executed by the computer, cause the computer to:
   receive trusted data through a user interface; and
   store the trusted data received through the user interface.

13. The computer-readable storage medium of claim 10, wherein the trusted data comprises data that originates in a trusted secure zone containing the trusted computing system and upon which one or more security decisions can be made.

14. An apparatus for enabling communication between a trusted computing system and an untrusted computing system, the apparatus comprising:
   at least one processor; and
   a computer-readable storage medium having computer-executable instructions stored thereon which, when executed on the at least one processor, causes the apparatus to
      receive a message comprising trusted data from the untrusted computing system directed to the trusted computing system,
      compare the trusted data in the message to previously stored trusted data,
      in response to a determination that the trusted data in the message and the previously stored trusted data are different, modify the message by overwriting the trusted data in the message with the previously stored trusted data, and
      transmit the modified message to the trusted computing system.

15. The apparatus of claim 14, wherein the computer-readable storage medium has further computer-executable instructions stored thereupon which, when executed by the processor, cause the apparatus to:
   receive a message from the trusted computing system directed to the untrusted computing system;
   extract trusted data from the message;
   store the trusted data; and
   transmit the message to the untrusted computing system.

16. The apparatus of claim 14, wherein the computer-readable storage medium has further computer-executable instructions stored thereupon which, when executed by the processor, cause the apparatus to:
   receive trusted data through a user interface; and
   store the trusted data received through the user interface.

17. The apparatus of claim 15, wherein the computer-readable storage medium has further computer-executable instructions stored thereupon which, when executed by the processor, cause the apparatus to:
   determine that the message received from the trusted computing system is not permitted to be transmitted to the untrusted computing system; and
   in response to determining that the message received from the trusted computing system is not permitted to be transmitted to the untrusted computing system, not transmit the message received from the trusted computing system to the untrusted computing system.

18. The apparatus of claim 17, wherein the computer-readable storage medium has further computer-executable instructions stored thereupon which, when executed by the processor, cause the apparatus to generate an alert message in response to determining that the message received from the trusted computing system is not permitted to be transmitted to the untrusted computing system.

19. The apparatus of claim 17, wherein the computer-readable storage medium has further computer-executable instructions stored thereupon which, when executed by the processor, cause the apparatus to generate an error message to the trusted computing system in response to determining that the message received from the trusted computing system is not permitted to be transmitted to the untrusted computing system.

20. The apparatus of claim 14, wherein the computer-readable storage medium has further computer-executable instructions stored thereupon which, when executed by the processor, cause the apparatus to:
  determine that the message received from the untrusted computing system is not permitted to be transmitted to the trusted computing system; and
  in response to determining that the message received from the untrusted computing system is not permitted to be transmitted to the trusted computing system, not transmit the message received from the untrusted computing system to the trusted computing system.

21. The apparatus of claim 20, wherein the computer-readable storage medium has further computer-executable instructions stored thereupon which, when executed by the processor, cause the apparatus to generate an alert message in response to determining that the message received from the untrusted computing system is not permitted to be transmitted to the trusted computing system.

22. The apparatus of claim 20, wherein the computer-readable storage medium has further computer-executable instructions stored thereupon which, when executed by the processor, cause the apparatus to generate an error message to the untrusted computing system in response to determining that the message received from the untrusted computing system is not permitted to be transmitted to the trusted computing system.

23. The apparatus of claim 14, wherein the computer-readable storage medium has further computer-executable instructions stored thereupon which, when executed by the processor, cause the apparatus to generate an alert message in response to determining that the trusted data in the message received from the untrusted computing system and the stored trusted data are different.

24. The apparatus of claim 14, wherein the computer-readable storage medium has further computer-executable instructions stored thereupon which, when executed by the processor, cause the apparatus to transmit the message received from the untrusted computing system to the trusted computing system without modification in response to a determination that the trusted data in the message and the stored trusted data are not different.

25. The apparatus of claim 15, wherein the message from the trusted computing system directed to the untrusted computing system comprises a message for provisioning the trusted computing system.

26. The apparatus of claim 16, wherein the trusted data received through the user interface comprises data for provisioning a user.

27. The apparatus of claim 14, wherein the message from the untrusted computing system directed to the trusted computing system comprises a message relating to user configuration.

28. The apparatus of claim 14, wherein the message from the untrusted computing system directed to the trusted computing system comprises a message relating to a configuration of the trusted computing system.

* * * * *